(12) United States Patent
Arumugam

(10) Patent No.: US 10,453,050 B1
(45) Date of Patent: Oct. 22, 2019

(54) SYSTEMS AND METHODS FOR FLEXIBLE CHECKOUT

(71) Applicant: JPMorgan Chase Bank, N.A., New York, NY (US)

(72) Inventor: Avin Arumugam, San Francisco, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 463 days.

(21) Appl. No.: 14/603,489

(22) Filed: Jan. 23, 2015

Related U.S. Application Data

(60) Provisional application No. 61/930,994, filed on Jan. 24, 2014.

(51) Int. Cl.
- G06Q 30/00 (2012.01)
- G06Q 20/32 (2012.01)
- G06Q 20/40 (2012.01)
- G06Q 20/20 (2012.01)

(52) U.S. Cl.
CPC ......... G06Q 20/3274 (2013.01); G06Q 20/20 (2013.01); G06Q 20/40 (2013.01)

(58) Field of Classification Search
CPC .................................................. G06Q 20/3274
USPC .............................................................. 705/44
See application file for complete search history.

(56) References Cited

U.S. PATENT DOCUMENTS

| | | | |
|---|---|---|---|
| 7,319,987 B1 * | 1/2008 | Hoffman | G06Q 20/40 705/44 |
| 8,924,292 B1 * | 12/2014 | Ellis | G06Q 20/36 705/41 |
| 9,773,212 B2 * | 9/2017 | Hammad | G06Q 10/00 |
| 2003/0105725 A1 * | 6/2003 | Hoffman | G06F 21/32 705/75 |
| 2011/0055585 A1 * | 3/2011 | Lee | H04L 9/0844 713/183 |
| 2011/0078031 A1 * | 3/2011 | Mardikar | G06Q 20/20 705/17 |

(Continued)

OTHER PUBLICATIONS

Katz, Introduction to Modern Cryptography, Chapman & Hall, 2008, pp. 3-28 [emphasis pp. 3-8].*

(Continued)

*Primary Examiner* — Jay Huang
*Assistant Examiner* — Michael I Ezewoko
(74) *Attorney, Agent, or Firm* — Greenblum & Bernstein, P.L.C.

(57) ABSTRACT

Embodiments of the present invention are directed to systems and methods for flexible checkout. A customer conducting a payment or purchase transaction with a financial account or payment card may obtain a bar code, QR code or other symbol (associated with the financial account or payment card) to be scanned by a POS reader/scanner rather than swiping the payment card or even possessing any physical card. According to some embodiments, the customer may choose from at least two checkout options, for example, based on the type of merchant involved in the transaction. For checkout at a physical store, a single-use code or symbol may be generated and scanned by POS equipment in lieu of swiping a payment card. For e-commerce checkout, the customer may be directed to a one-click payment process wherein a one-time token is submitted to the online merchant in lieu of real payment card account data.

19 Claims, 4 Drawing Sheets

(56) References Cited

U.S. PATENT DOCUMENTS

| | | | | |
|---|---|---|---|---|
| 2013/0018794 A1* | 1/2013 | Ungerland, II | ...... | G06Q 20/223 |
| | | | | 705/44 |
| 2013/0103584 A1* | 4/2013 | Eichner | .................. | G06O 20/02 |
| | | | | 705/44 |
| 2013/0275308 A1* | 10/2013 | Paraskeva | .............. | G06Q 20/32 |
| | | | | 705/71 |
| 2014/0108249 A1* | 4/2014 | Kulpati | .............. | G06Q 20/3223 |
| | | | | 705/44 |
| 2014/0172717 A1* | 6/2014 | Bedier | .................. | G06Q 20/12 |
| | | | | 705/44 |
| 2014/0229379 A1* | 8/2014 | Jang | .................... | G06Q 20/385 |
| | | | | 705/44 |
| 2015/0066765 A1* | 3/2015 | Banks | .................... | G06Q 40/02 |
| | | | | 705/44 |

OTHER PUBLICATIONS

Algorithms+Data Structures=Programs, 1976, pp. xii-55.*
HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*

* cited by examiner

SYSTEMS AND METHODS FOR FLEXIBLE CHECKOUT

CROSS-REFERENCE TO RELATED APPLICATIONS

The present application claims priority of U.S. Provisional Application No. 61/930,994, filed on Jan. 24, 2014. The present application is related to a co-pending utility application filed concurrently herewith, entitled "SYSTEMS AND METHODS FOR STREAMLINED CHECKOUT," which claims priority of U.S. Provisional Application No. 61/930,992, filed on Jan. 24, 2014. Each of the above-mentioned related applications is incorporated by reference herein in its entirety.

TECHNICAL FIELD

Embodiments of the present invention are related generally to systems and methods for flexibly assisting a customer to access a financial account, and, more particularly, to techniques for providing checkout options to a customer at any point of sale (POS).

BACKGROUND OF THE INVENTION

Customer authentication (i.e., confirming the identity of the customer) is critical for most financial transactions such as purchases with payment cards and automated teller machine (ATM) withdrawals.

Conventional customer authentication schemes typically rely on one or both of two authentication factors: a possession factor and a knowledge factor. The possession factor refers to "something only the customer has," such as a unique debit card, credit card, smart card, or token device (e.g., Exxon® Speedpass™). The knowledge factor refers to "something only the customer knows," such as a password or personal identification number (PIN).

FIG. 1 illustrates typical prior methods of customer authentication for payment card based transactions. For example, in most card-present credit card purchases, the cardholders become authenticated simply by swiping their credit cards, which is a type of single-factor authentication based on the possession factor. In contrast, online purchases are typically card-not-present (CNP) transactions where the authentication also relies heavily on the knowledge factor: the customer has to supply both payment card information (e.g., cardholder name, card number and expiration date, which is presumably only known to the person possessing the physical card) and billing information (e.g., billing address and telephone number associated with the card, which is presumably only known to the legitimate cardholder). A typical ATM transaction utilizes a two-factor authentication where the cardholder not only has to insert or swipe a credit or debit card (something only the cardholder is supposed to have) but also has to enter a correct PIN code (something only the cardholder is supposed to know).

However, a number of deficiencies still exist with the conventional customer authentication and checkout processes. While the single-factor authentication in card-present transactions seems straightforward, that approach is both insecure (as a payment card can be lost or stolen and then subject to unauthorized uses, or the card swiped could be a counterfeit card—an exact replica of the authentic card) and inconvenient (since the cardholder must carry the card and present it at the point of sale). As to the two-factor authentication approaches, the cardholder is required to either carry the card (e.g., in an ATM transaction) or at least memorize the card information (e.g., for online purchases), and the additional information supplied for authentication purpose may be too hard for the cardholder to memorize (in the case of unique PINs or passwords) or too easy for others to obtain (in the case of addresses, telephone numbers, or re-used PINs or passwords), not to mention the inconvenience of having to supply the additional information for each transaction. In general, there has been a trade-off between security and convenience/efficiency: the more secure an authentication method, the more information the cardholder is required to supply, or figuratively speaking, the more hoops the customer has to jump through.

One notable prior authentication approach is the one adopted by Europay, MasterCard and Visa (EMV) which implemented a global standard for inter-operation of integrated circuit cards (IC cards, a.k.a. "smart cards" or "chip cards") and IC-card-capable POS terminals and ATMs for authenticating credit and debit card transactions. For customer authentication, the EMV standard requires the reading of a smart card and the correct entry of a PIN passcode, which is essentially a two-factor authentication scheme similar to traditional ATM transactions. Apparently, the EMV standard is only useful for card present transactions (thus inapplicable to online purchases) and also not free from some of the deficiencies described above.

By focusing on the knowledge factor and/or the possession factor, the prior authentication methods often fail to take advantage of a more powerful authentication factor, the inherence factor, which basically refers to and takes advantage of "something only the user is" such as biometric characteristics (e.g., fingerprint, voice signature, and retinal pattern). Fundamentally, the inherence factor such as biometric characteristics should more reliably confirm the identity of a person than the knowledge factor and/or possession factor. Biometric techniques such as fingerprint scanning have existed for a while now, but they have not been widely or effectively applied to customer authentication in the context of card transactions or personal banking.

Another problem with conventional checkout processes is that they are monolithic and inflexible. Prior systems typically apply authentication policies that do not differentiate between types of transactions, accounts, or account holders, thereby failing to account for potential risk levels of different transactions. As a result, the same authentication policy is uniformly applied regardless of the type of interaction or channel, even though some types of interactions are much riskier than others. For example, the same procedure of card-swiping and/or PIN-entry could be followed whether the purchase is for a $1 chewing gum or a $5,000 plasma TV. Nor do the customers typically have any say in the authentication method during checkout.

Furthermore, there is a wealth of other types of information (e.g., location, behavioral history) that can supplement and/or enhance the effectiveness of customer authentication but have not been fully exploited.

Other problems and drawbacks also exist in prior customer authentication and checkout methods.

BRIEF SUMMARY OF THE INVENTION

Embodiments of the present invention are directed to improved techniques for authenticating customers and streamlining their checkout experiences which overcome at least some of the above-mentioned problems and drawbacks in the prior art.

According to some embodiments, a customer can use a mobile computing device to become authenticated and be issued a single-use bar code (one-dimensional or 1-D), QR code (two-dimensional or 2-D), or other machine-readable or scan-able symbol which can be read or scanned by point of sale (POS) equipment in lieu of swiping a payment card. The scanned code may then be forwarded to an authorization server that verifies the code and matches it to a corresponding payment card or account.

According to other embodiments, a customer may log into a mobile app or portal to initiate a checkout process. Upon authentication, the customer may be presented with two checkout options: for an e-commerce checkout, the customer may be directed to a one-click payment process (for example, as described in the related, co-pending application); for POS checkout at a brick and mortar (B&M) store, the customer may be issued a single-use scan-able or machine-readable code or symbol to be scanned or read by the POS equipment.

According to one particular embodiment, the customer may interact with a passbook on his or her computing device and may be able to select a desired payment account or funding source to charge for a current transaction.

Additional features and advantages of the invention will be set forth in the description that follows, and in part will be apparent from the description, or may be learned by practice of the invention.

BRIEF DESCRIPTION OF THE DRAWINGS

The accompanying drawings are included to provide a further understanding of the invention and are incorporated in and constitute part of this specification, illustrate several embodiments of the invention and, together with the description, serve to explain the principles of the invention. The purpose and advantages of the present invention will be apparent to those of skill in the art from the following detailed description in conjunction with the appended drawings wherein.

DETAILED DESCRIPTION OF PREFERRED EMBODIMENTS

Embodiments of the present invention are directed to systems and methods for flexible checkout. A customer conducting a payment or purchase transaction with a financial account or payment card may obtain a bar code, QR code or other symbol (associated with the financial account or payment card) to be read or scanned by a POS reader/scanner rather than swiping the payment card or even possessing any physical card. According to some embodiments, the customer may choose from at least two checkout options, for example, based on the type of merchant involved in the transaction. For checkout at a physical store, a single-use code or symbol may be generated and scanned by POS equipment in lieu of swiping a payment card. For e-commerce checkout, the customer may be directed to a one-click payment process wherein a one-time token is submitted to the online merchant in lieu of real payment card account data.

Figure 1:
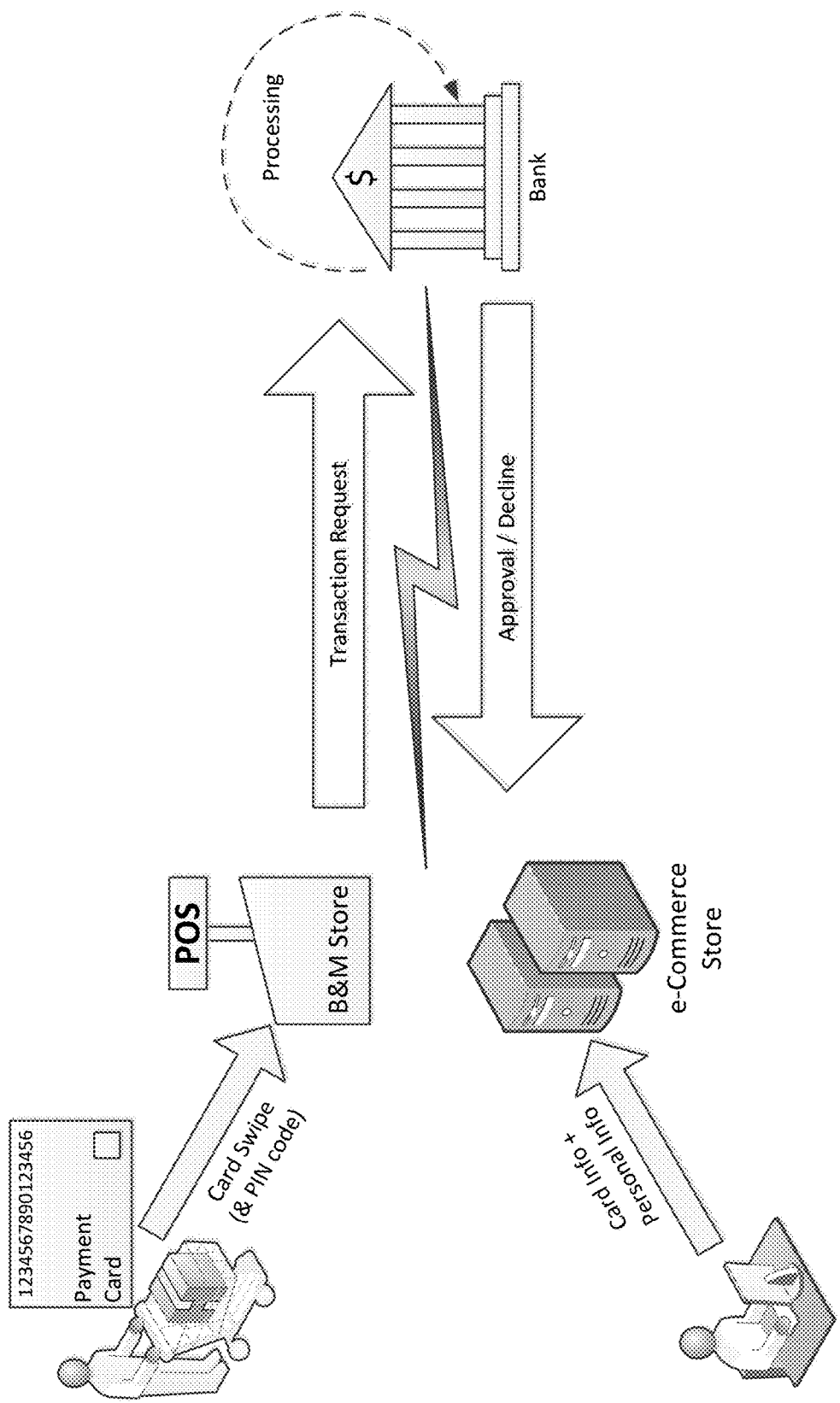
FIG. 1 is a block diagram illustrating prior methods of customer authentication and checkout processes.
Figure 2:
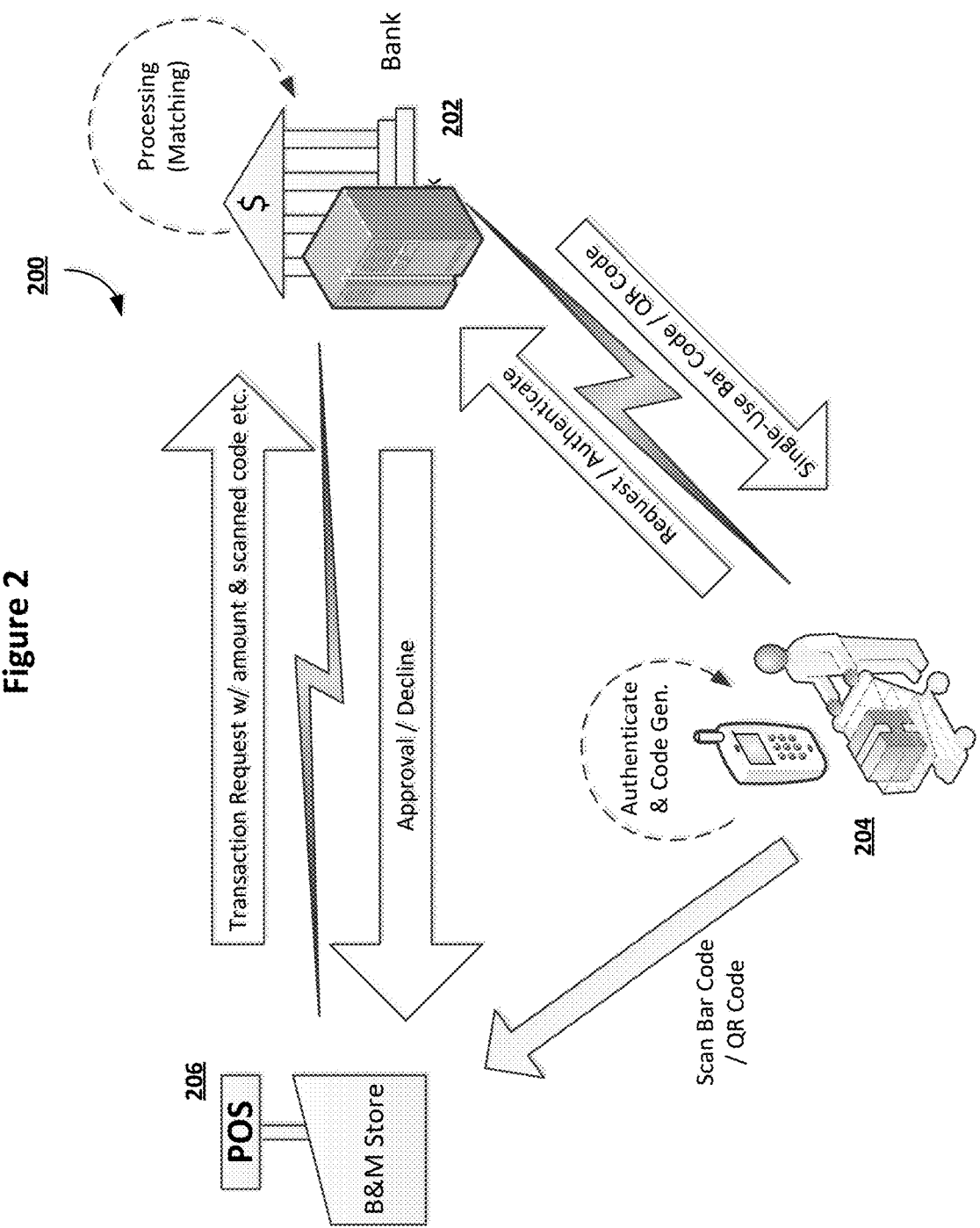
FIG. 2 is a block diagram illustrating an exemplary customer authentication and checkout process in accordance with an embodiment of the invention.

FIG. 2 is a block diagram illustrating an exemplary system 200 for customer authentication and checkout in accordance with an embodiment of the invention.

As shown, the system 200 is implemented based on computing equipment. Generally, it should be noted that the components depicted and described herein may be, or include, a computer or multiple computers. Although the components are sometimes shown as discrete units, they may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types. For example, a server may comprise a single server or a group of servers used to service users. Additionally, a server may comprise a front-end web server and a back-end database server. Alternatively, those functions can be integrated into a single server device.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computing devices (e.g., mobile devices, lap-tops, desktops, etc.) typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or Apple iOS operating systems, Google Android operating system (and variations thereof), Microsoft Windows® operating system (desktop and/or mobile version), the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system or platform.

User applications may be so-called stand-alone applications executing on user devices or they may be client-server type applications that interface with server-side components.

They may include applications provided by the server, such as Java Applets, that may be delivered with web pages.

The memory will include at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described herein and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, processor, CPU (Central Processing Unit), programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It is appreciated that in order to practice the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described herein is performed by various components and various memories. However, it is appreciated that the processing performed by two distinct components as described herein may, in accordance with a further embodiment of the invention, be performed by a single component. Further, the processing performed by one distinct component as described herein may be performed by two distinct components. In a similar manner, the memory storage performed by two distinct memory portions as described herein may, in accordance with a further embodiment of the invention, be performed by a single memory portion. Further, the memory storage performed by one distinct memory portion as described herein may be performed by two memory portions, for example.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. Input devices include those that recognize hand movements or gestures, such as in the case of gesture set supported by Android or the swipe movements recognized in iOS-based devices. These and other input devices are often connected to the processing unit through a user input interface that is coupled to the system bus, but may be connected by other interface and bus structures, such as a parallel port, game port or a universal serial bus (USB).

A user interface may include any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the invention, it is not necessary that a human user actually interact with a user interface used by the processing machine of the invention. Rather, it is also contemplated that the user interface of the invention might interact, i.e., convey and receive information, with another processing machine, rather than a human user. Further, it is contemplated that a user interface utilized in the invention may interact partially with another processing machine or processing machines, while also interacting partially with a human user.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described herein.

Various networks may be implemented in accordance with embodiments of the invention, including a wired or wireless local area network (LAN) and a wide area network (WAN), the Internet, wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 200 may comprise an authorization server 202 operated by or on behalf of a bank or other financial institution functioning as a merchant acquirer or payment card issuer. The authorization server 202 may comprise at least one computer processor, storage media, and communication interfaces. The system 200 may also comprise customer computing devices 204 such as iOS-based, Android-based, or other types of smart phones or tablet computers.

In operation, a customer visiting a physical store 206 (also referred to as a "brick and mortar" (B&M) store) may pick up some merchandise and then attempt to pay for them in a checkout process. Instead of physically swiping (or even bringing) a payment card, the customer may use his or her mobile computing device 204 for the POS checkout.

First, the customer is authenticated by the mobile computing device 204 or by the authorization server 202 (through the mobile computing device 204). Preferably, the customer is authenticated with his or her mobile computing device such as an iOS-based, Android-based, or other type of smart phone device. More preferably, the authentication may take advantage of one or more biometric sensing technologies available on the smart phone devices. For example, some smart phone devices are equipped with a biometric sensor such as a fingerprint scanner. The new Apple iPhone 5S device has embedded in the Home button a fingerprint identity sensor known as "Touch ID." A quick touch on the sensor could reliably confirm the iPhone user's identity and generate OS-level biometric or authentication data usable by a suitable app. Other smart phone devices having a fingerprint scanner include Motorola ATRIX 4G.

Apart from fingerprint scanning, other types of biometric sensing technologies may also be feasible on a mobile computing device. For example, almost every smart phone device includes at least one camera which could be used to photograph certain physical attribute(s) of a human body, such as facial features, eyes (retina/iris), ear, or palm and to verify a person's identity based at least in part on such attribute(s). Alternatively or additionally, the audio recording function of a smart phone may be utilized to recognize and distinguish voice signatures of different users for authentication purposes.

Customer authentication may also take advantage of other information such as location, behavior patterns, device information, network connection parameters, personal credentials, delegation credentials, and so on.

For example, the device's GPS location and/or Wi-Fi or cellular network connection points may enhance the confidence of customer authentication. For instance, if the GPS location shows the device user is in or near the account-holder's or cardholder's home or work place (or other places where he or she is known to frequent), or if the network connection shows an IP or MAC address same as a previous address from which the user connected to complete authentication, then it may be concluded that the user is more likely to be who he or she claims to be.

For another example, the presence of a valid cookie or other data indicating a successful login on the Facebook, Twitter, or other social networking or trusted website, if consistent with the customer's purported credentials, may further confirm the customer's identity. To the extent necessary or feasible, the authentication server may simultaneously access one or more of those other social networking or trusted websites to confirm recent access thereto by the customer.

According to certain embodiments of the present invention, the authentication need not always pinpoint a customer's individual identity in every checkout transaction, but may simply confirm the customer belongs to a trusted group of persons.

According to some embodiments, the form of authentication and the level of security may be varied depending on the level of potential risk involved in the contemplated transaction. The higher the risk level, the more stringent the authentication measure.

Figure 3:
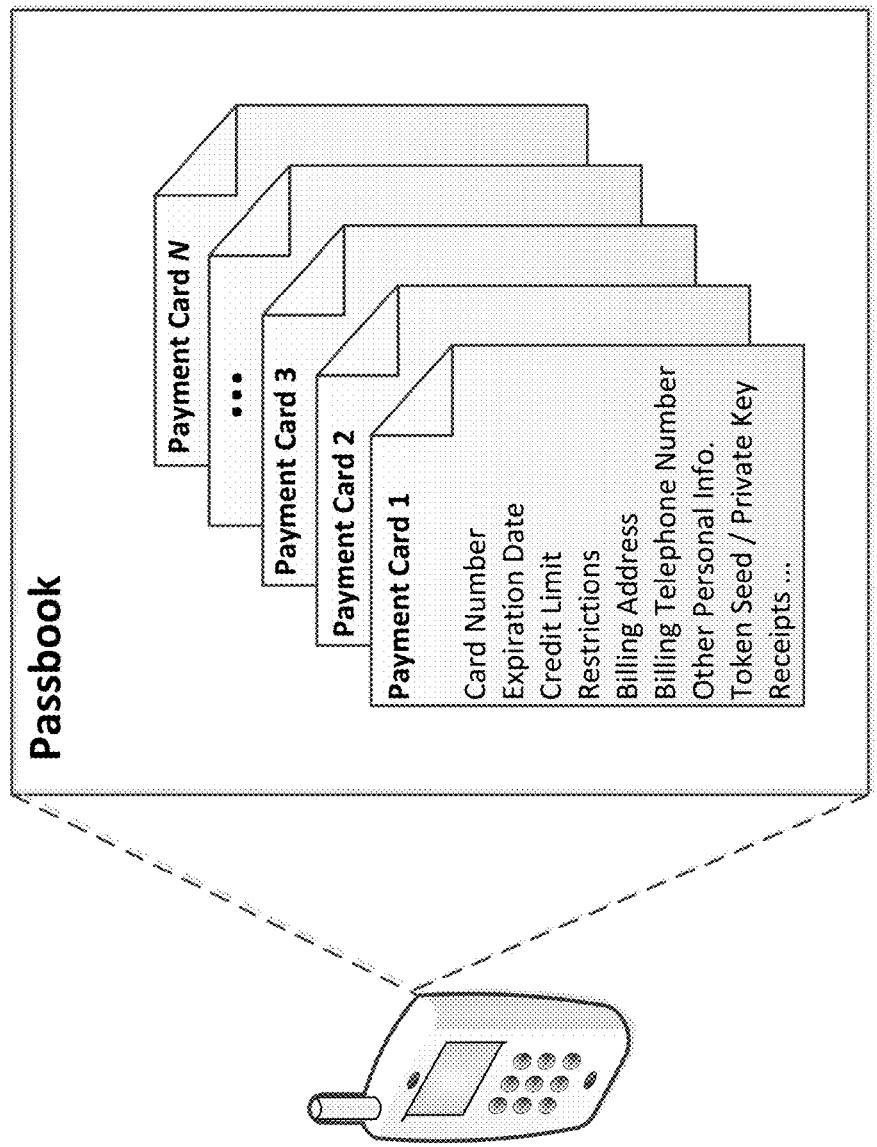
FIG. 3 is a block diagram illustrating an exemplary passbook in accordance with an embodiment of the invention.

In addition to authentication, the mobile computing device 204 may also serve to store data of payment cards or accounts, for example, in a passbook (or electronic wallet). FIG. 3 is a block diagram illustrating an exemplary passbook in accordance with an embodiment of the invention. This passbook may be implemented as a secure (encrypted) data structure or application on a mobile device. The passbook may serve as a data repository to store information related to a plurality of payment cards, accounts, or other funding sources. For ease of illustration, the exemplary passbook shown in FIG. 3 contains data associated with N different payment cards (N being a positive integer). Each set of funding data corresponding to a payment card may comprise one or more of a card number, an expiration date, credit limit (or remaining credit balance), usage restrictions (if any), billing address, billing telephone number, and/or other personal information. According to some embodiments, the funding data may also include transaction data such as purchase and/or payment receipts. According to other embodiments, the passbook may further include private key(s) or other credentials, which may be passbook/user-specific or card/account-specific, for secure communications with a remote server or other devices. According to embodiments of the present invention, the passbook may be set up in connection with an Internet banking app or card member website.

According to some embodiments, the passbook (e.g., as a mobile app) may provide a user interface for access by its authorized user upon successful authentication. According to other embodiments, the passbook (e.g., as a secure data structure) may be only accessible by certain trusted applications or threads. In both cases, it is preferable for the passbook to be able to communication with or be updated by another data source such as a remote server of a card issuer.

Next, once the customer is authenticated as an authorized card holder, the mobile computing device 204 may generate and display a single-use bar code, QR code or other type of machine-readable or scan-able symbol (hereinafter referred to simply as a "code"). For example, the code may be created, based on a secret algorithm, from account data of a particular payment card selected from the passbook, such that it may be decoded by reversing the secret algorithm to recover the real account data. For another example, the code or symbol may be randomly generated by mobile computing device 204 and then shared with the authorization server 202 (e.g., separately transmitted to the server immediately or in near real-time). The code/symbol may include time-stamped or transaction-specific information to make it valid only for a limited period of time and/or in other restricted manner (e.g., only for payment to the merchant located at or near the mobile computing device's current GPS coordinates).

The code/symbol or its association with the real credit card may be set to expire a short period of time (e.g., a few minutes or up to a couple of hours) after generation. There may be other restrictions on the use of the code/symbol. For example, the code/symbol may be limited to payments to a specific online or offline merchant or those stores that have passed certain certification or belong to a merchant group served by a particular acquirer or payment processor. For another example, the code/symbol may be limited to a transaction amount up to a preset spending limit. If the transaction amount is greater than the preset limit, the transaction request may be denied or the authorization server may require additional authentication and/or cause an additional code or symbol to be generated.

Alternatively, the customer authentication and/or code generation may take place on the authorization server 202 via a communication link with the mobile computing device 204. If originating from the authorization server 202, the code/symbol need not be mathematically derived from or related to the real account data. The authorization server 202 may establish a correlation between the real payment card account and the code, for example, with a matching list or lookup table. As mentioned above, the code may be made transaction-specific and/or time-sensitive. The code may then be transmitted to the customer's mobile computing device 204, for example, for temporary storage in a passbook or direct display on the screen.

According to yet another embodiment, the customer's computing device may pre-store a number of bar codes, QR codes, or symbols that have been generated (e.g., by the remote server) and associated with the corresponding card (s)/account(s) in advance.

In terms of logistics, the code or symbol may be transmitted in an encrypted form. In addition, the code may include an error-checking mechanism such as checksum characters. To the extent it is generated on the authorization server 202 and then delivered to the customer's mobile computing device 204, the code may be either "pushed" by the server to the device or "pulled" by the device from the server. According to one particular embodiment, the code generation may be automatic, for example, triggered by the customer entering a shopping mall or physical store (e.g., as detected based on GPS location data). For instance, a passbook on the customer's mobile computing device 204 may be so triggered into requesting a code in anticipation of an impending checkout/payment. Alternatively, the authorization server 202 may periodically push one or more fresh one-time (or limited-time) tokens to the customer's mobile computing device 204 (e.g., for storage in a passbook).

Then, the customer may get the code or symbol scanned or read by a POS device at the store 206 which in turn forwards the code/symbol along with a transaction request to the authorization server 202 for processing. The authorization server 202 (of the merchant acquirer or card issuer) may receive and decode (if needed) the code/symbol forwarded from the merchant 206 along with the transaction request. According to some embodiments, the authorization server 202 may use a secret algorithm to recover or derive the real account data from the code. Alternatively, according to other embodiments, the authorization server 202 may match the code with the corresponding payment card account owned by the customer, for example, based on a lookup table maintained by the server. In either case, the real account data of the payment card may be retrieved and any authorized transaction amount can now be charged to the correct account.

Finally, the authorization server 202 may return an approval or denial message to the merchant 206, authorizing the current transaction with the customer, and the POS checkout is completed.

Figure 4:
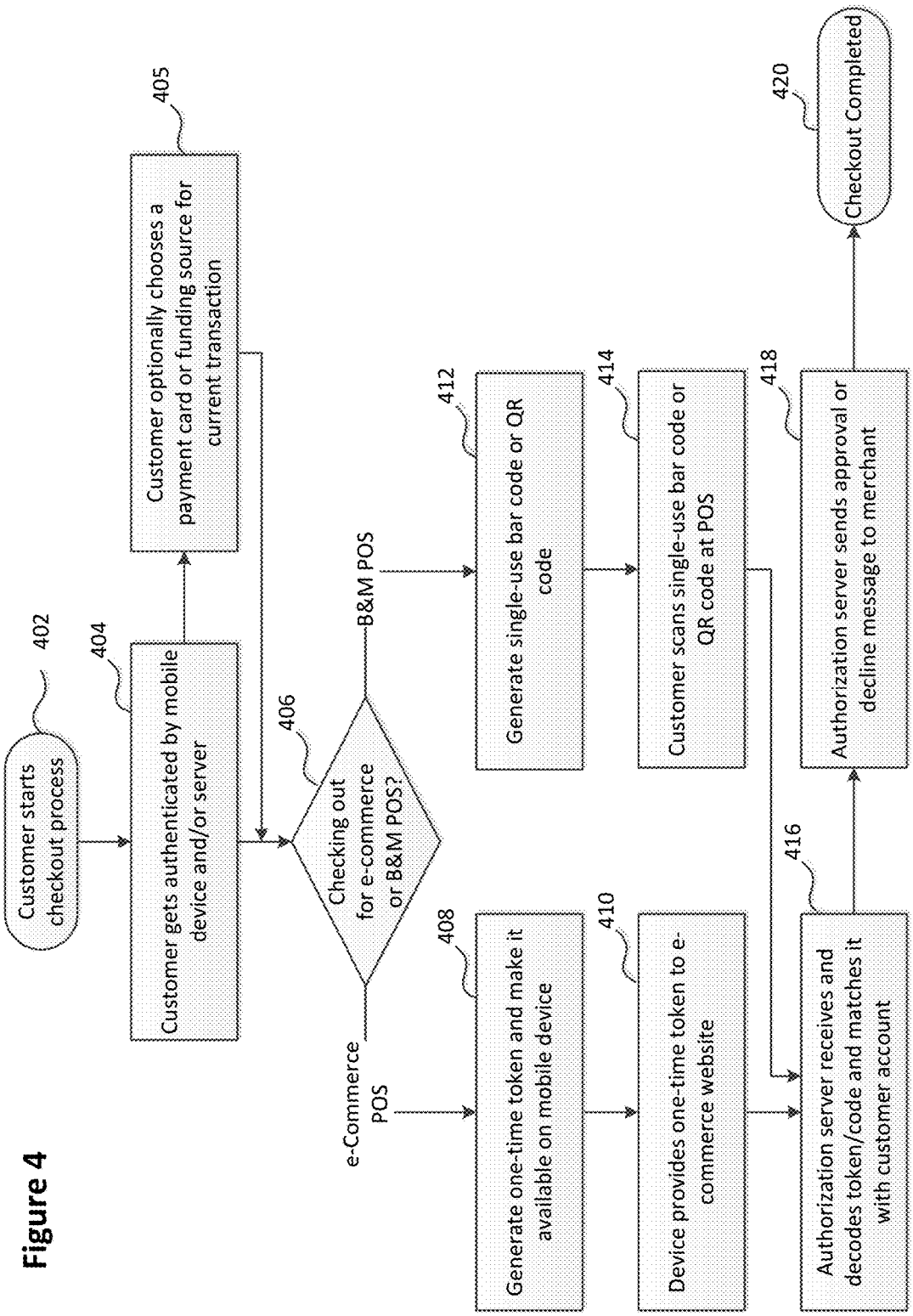
FIG. 4 is a flowchart illustrating an exemplary flexible checkout process in accordance with an embodiment of the invention.

FIG. 4 is a flowchart illustrating an exemplary flexible checkout process in accordance with an embodiment of the invention.

In Step 402, a customer may start a checkout process in a purchase or payment transaction. For example, the customer may be purchasing merchandise in an online store such as Amazon.com or Overstock.com or in a physical store such as Target or Nordstrom. Or, the customer may be making a payment to another individual or company via a web portal or in a money transfer store (e.g., Western Union). The customer may be using a computing device such as a smart phone or a tablet computer.

In Step 404, the customer may get authenticated by the mobile computing device and/or a remote server. The authentication may take any of the forms as described above.

In Step 405, the customer may optionally choose a payment card or funding source for the current transaction.

For example, the customer may be logged into a passbook on the mobile computing device and can choose one of the stored credit card, debit card, or stored value card to fund the current transaction. Alternatively, the selection may be automated based on pre-programmed preferences or rules (e.g., to maximize rewards points, always use the Amazon Rewards Visa Card for purchases on Amazon.com and always use Chase Sapphire Card for all travel-related transactions). The selection of funding source may also be based on card types, for example, using a credit card in most trusted online stores and using a stored value card having a low balance with less trusted online merchants. It can be appreciated by those skilled in the art that many other selection methods are possible.

In Step 406, it may be determined whether the contemplated transaction is conducted with an e-commerce merchant's online store or at a B&M store POS. If the checkout is at an e-commerce POS, the customer may be directed to a one-click payment portal or app, wherein a one-time token may be generated and made available to the mobile device in Step 408 and the mobile device may provide the token to the e-commerce store website in Step 410 in lieu of supplying real payment card information. If the checkout is at a B&M store POS, a single-use code or symbol (e.g., bar code or QR code or other symbol) may be generated and made available to the mobile device in Step 412 as described above and the customer may scan the code with a POS equipment in Step 414 in lieu of swiping a read payment card. Either type of merchants may forward to an authorization server a transaction request along with the token or code/symbol.

Then, in Step 416, the authorization server may receive and decode the token or code/symbol and match it with a corresponding payment card/account held by the customer. Once the token or code/symbol has been verified and validated (including clearance of any spending limit and/or usage restriction), the transaction amount may be charged to the correct account.

In Step 418, the authorization server may send an approval or decline message back to the merchant. The checkout is finally completed in Step 420.

These examples are merely illustrative and embodiments of the customer authentication or checkout system described herein may be implemented to execute a myriad of customer authentication or checkout interactions. While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented method for flexible checkout, the method comprising programming at least one processor of a mobile computing device to cause it to perform the following:

authenticating a customer with a mobile computing device based on one or more biometric sensing technologies;

determining whether an active checkout transaction initiated by the customer is at an e-commerce website or at a physical store point-of-sale (POS);

when the checkout transaction is with the e-commerce website, generating a one-click payment portal;

directing the customer to the one-click payment portal, wherein a one-time electronic token is generated and made available to the mobile computing device, and automatically providing the one-time electronic token to the e-commerce website;

when the checkout transaction is at the physical store POS, generating or receiving, in response to the authenticating of the customer, a machine readable code or symbol temporarily associated with a payment account, and displaying the machine readable code or symbol for scanning by a point-of-sale device at the physical store POS, thereby submitting a payment without revealing at least some of real data associated with the payment account, wherein the code or symbol is configured to be forwarded to an authorization server for processing, such that a real account data of a payment card is retrieved from the authorization server and any authorized transaction can be charged to the payment account of the card.

2. The method according to claim 1, wherein the machine readable code or symbol is generated by said at least one processor of said mobile computing device.

3. The method according to claim 2, wherein the machine readable code or symbol is generated with a secret algorithm.

4. The method according to claim 2, wherein the machine readable code or symbol is generated randomly and then shared with a remote server.

5. The method according to claim 1, wherein the machine readable code or symbol is set to expire after a predetermined period of time beyond which its association with the payment account is no longer valid.

6. The method according to claim 1, wherein the machine readable code or symbol is limited to a transaction with one or more designated merchants.

7. The method according to claim 1, wherein the machine readable code or symbol is limited to a transaction at or near a GPS location of said mobile computing device.

8. The method according to claim 1, wherein the machine readable code or symbol is selected from a group consisting of: a one-dimensional bar code, a two-dimensional bar code, a QR code, and an image or symbol with at least one machine-readable pattern.

9. The method according to claim 1, wherein a form of authentication and a level of transaction security is varied depending on a level of potential risk involved in the contemplated transaction.

10. The method according to claim 1, wherein the code or symbol is limited to a transaction amount up to a preset spending limit, wherein if the transaction amount is greater than the preset limit a transaction request may requires additional authentication.

11. A computer-implemented method for facilitating flexible checkout, the method comprising programming at least one processor of a server computer to cause it to perform the following:

authenticating or confirming successful authentication of a customer with a mobile computing device based on one or more biometric sensing technologies;

determining whether an active checkout transaction initiated by the customer is at an e-commerce website or at a physical store point-of-sale (POS);

when the checkout transaction is with the e-commerce website,
  generating a one-click payment portal;
  directing the customer to the one-click payment portal, wherein a one-time electronic token temporarily associated with a payment account is generated and made available to the mobile computing device, and automatically providing the one-time electronic token to the e-commerce website;

when the checkout transaction is at the physical store POS,
  generating or causing to be generated, in response to the step of authenticating or confirming, a machine readable code or symbol temporarily associated with the payment account, the machine readable code or symbol being made available to the customer for scanning by a point-of-sale device at the physical store POS as a form of payment without revealing at least some of real data associated with the payment account wherein the code or symbol is configured to be forwarded to an authorization server for processing, such that a real account data of a payment card is retrieved from the authorization server and any authorized transaction can be charged to the payment account of the card;

receiving a transaction request including the one-time electronic token or the scanned machine readable code or symbol; and verifying the one-time electronic token or the machine readable code or symbol and matching it to the corresponding payment account, thereby making a decision to approve or decline the transaction request.

12. The method according to claim 11, wherein the machine readable code or symbol is generated with a secret algorithm.

13. The method according to claim 11, wherein the machine readable code or symbol is generated randomly.

14. The method according to claim 11, further comprising:
  configuring the machine readable code or symbol to expire after a predetermined period of time beyond which its association with the payment account is no longer valid.

15. The method according to claim 11, wherein the machine readable code or symbol is limited to a transaction with one or more designated merchants.

16. The method according to claim 11, wherein the machine readable code or symbol is limited to a transaction at or near a GPS location of a mobile computing device operated by the customer.

17. The method according to claim 11, wherein the machine readable code or symbol is selected from a group consisting of: a one-dimensional bar code, a two-dimensional bar code, a QR code, and an image or symbol with at least one machine-readable pattern.

18. The method according to claim 11, wherein a form of authentication and a level of transaction security is varied depending on a level of potential risk involved in a contemplated transaction.

19. A computer-implemented method for flexible checkout, the method comprising programming at least one processor of a personal computing device to cause it to perform the following:
  authenticating a customer, with a mobile computing device based on one or more biometric sensing technologies, upon initiation of an active checkout process;
  determining, in response to the authenticating of the customer, whether the active checkout process is for an e-commerce transaction or a physical store transaction;
  if the checkout process is for a physical store transaction:
    generating, or causing to be generated, a machine readable code or symbol temporarily associated with a payment account, and
    displaying the machine readable code or symbol for scanning by a point-of-sale device at the physical store, thereby submitting a payment without revealing real data associated with the payment account;
  if the checkout process is for an e-commerce transaction with an online merchant:
  generating a one-click payment portal;
  directing the customer to the one-click payment portal, wherein a one-time electronic token temporarily associated with a payment account is generated and made available to the mobile computing device; and
  submitting the token to the online merchant as a form of payment without revealing the real data associated with the payment account, wherein the code or symbol is configured to be forwarded to an authorization server for processing, such that a real account data of a payment card is retrieved from the authorization server and any authorized transaction can be charged to the payment account of the card.

* * * * *